UNITED STATES PATENT OFFICE.

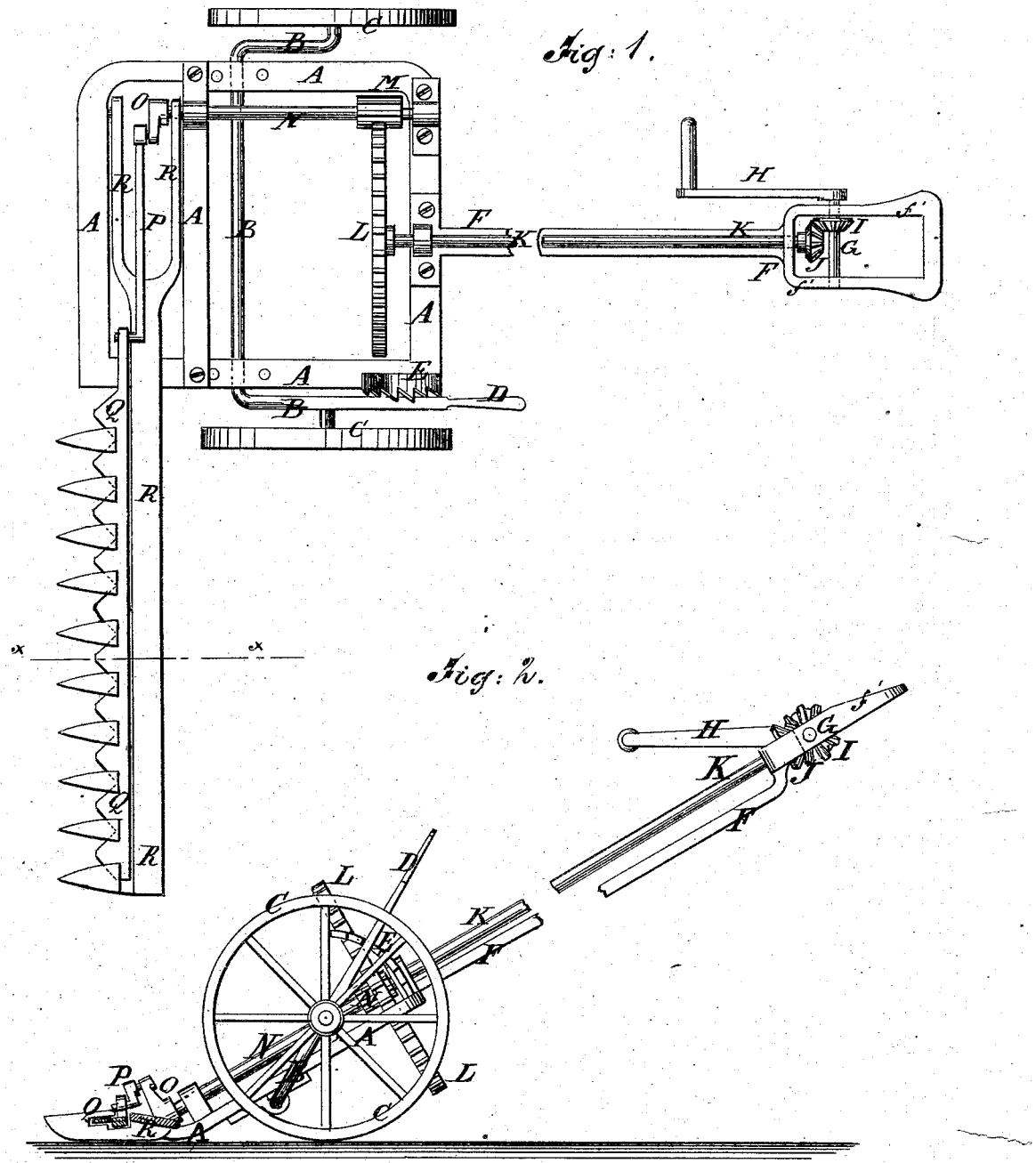

LEONARD G. YOUNGS, OF MORRIS, ILLINOIS, ASSIGNOR TO HIMSELF AND RICHARD HUGHES, OF SAME PLACE.

IMPROVEMENT IN LAWN-MOWERS.

Specification forming part of Letters Patent No. 158,162, dated December 22, 1874; application filed September 19, 1874.

*To all whom it may concern:*

Be it known that I, LEONARD G. YOUNGS, of Morris, in the county of Grundy and State of Illinois, have invented a new and useful Improvement in Lawn-Mowers, of which the following is a specification:

Figure 1 is a top view of my improved lawn-mower. Fig. 2 is a side view of the same, partly in section, through the line $x\ x$, Fig. 1.

Similar letters of reference indicate corresponding parts.

The invention relates particularly to the construction of the axle and ratchet-lever for vertically adjusting the frame and hand guide-bar of the machine, and also to the connection of the finger-bar with the frame, to adapt the former to be raised entirely off the ground when the machine is to be moved from one point or place to another, as hereinafter described.

The forward part of the rectangular frame A is bent upward, to adapt it to slide over the ground. The axle B has four right-angular bends, its extremities forming the journals of wheels C. Its straight central portion is connected to the under side of frame A by suitable bearings, and a lever, D, is attached to it, on one side, as shown. Said lever extends upward and backward, to adapt it to be locked with a curved ratchet-bar, E, and thus hold the frame A and its attachments at the desired height from the ground. To the middle part of the rear cross-bar of the frame A is rigidly attached the bar or handle F, by which the machine is propelled and guided. The loop $f$ serves as a hand-piece, and also as a support to the short shaft G, having crank H and small bevel-gear wheel I, into the teeth of which meshes bevel-gear wheel J of shaft K. The latter extends down along the handle F, and carries a gear-wheel, L, at its lower end, which operates the gear M of shaft N. Said shaft is arranged parallel to a side bar of frame A, and reciprocates the cutter-bar Q by means of the crank O, formed on its lower end. The cutter-bar vibrates in a groove in a part of the finger-bar R. The inner end of the cutter-bar R is forked, to allow space for the connecting-rod P and crank O to operate. The ends of the forks or branches are hinged or pivoted to the shaft N and the front cross-bar of frame A, so that the said cutter-bar, which extends beyond the side of the frame A, can rise and fall to adjust itself to any unevenness of the ground without interfering with the frame A, and so that the said frame A can adjust itself to any unevenness of the ground without interfering with the cutter-bar.

When the rear end of bar F is depressed the front end of the frame A is correspondingly elevated, and thereby the finger-bar also, since the latter is then supported by the side bar of said frame and the pivotal connection therewith. The upper surface of the rear part of the cutter-bar R, that projects at the side of the frame A is inclined downward and rearward, so that the cut grass may pass off it readily.

I do not claim, broadly, adjusting the cutting mechanism of a mower by means of a cranked axle operated by a ratchet-lever; but

Having thus described my invention, I claim as new and desire to secure by Letters Patent—

1. In a lawn-mower, the crank-axle B for supporting, and extension hand-lever D and ratchet E for adjusting, the main frame A, the parts being constructed and arranged as and for the purpose set forth.

2. The combination of the finger-bar R with the frame A, mounted on wheels C, and having the rear extension F, when said bar is pivoted to one side, and supported by the other side of said frame, as shown and described, for the purpose specified.

LEONARD G. YOUNGS.

Witnesses:
JOHN WINTERBOTTOM,
N. McBRIDE.